(12) United States Patent
Schwarz et al.

(10) Patent No.: US 10,626,879 B2
(45) Date of Patent: Apr. 21, 2020

(54) GAS TURBINE ENGINE WITH MID-COMPRESSOR BLEED

(71) Applicant: United Technologies Corporation, Farmington, CT (US)

(72) Inventors: Frederick M. Schwarz, Glastonbury, CT (US); William G. Sheridan, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 165 days.

(21) Appl. No.: 15/810,214

(22) Filed: Nov. 13, 2017

(65) Prior Publication Data

US 2019/0145420 A1 May 16, 2019

(51) Int. Cl.
  *F04D 27/02* (2006.01)
  *F02C 7/047* (2006.01)
  *F02C 7/18* (2006.01)
  *F04D 29/54* (2006.01)
  *F02C 6/08* (2006.01)
  (Continued)

(52) U.S. Cl.
  CPC ......... *F04D 27/023* (2013.01); *F01D 17/105* (2013.01); *F02C 6/08* (2013.01); *F02C 7/047* (2013.01); *F02C 7/185* (2013.01); *F02C 9/18* (2013.01); *F04D 29/545* (2013.01); *F05D 2270/303* (2013.01)

(58) Field of Classification Search
  None
  See application file for complete search history.

(56) References Cited

U.S. PATENT DOCUMENTS 3,632,223 A * 1/1972 Hampton .............. F04D 29/522
  415/144
5,155,993 A 10/1992 Baughman et al.
(Continued)

FOREIGN PATENT DOCUMENTS

EP 2518273 A2 10/2012
EP 3219964 A1 9/2017

OTHER PUBLICATIONS

EP Application No. 18206063.2 Extended EP Search Report dated Mar. 25, 2019, 7 pages.

*Primary Examiner* — Igor Kershteyn
*Assistant Examiner* — Jason G Davis
(74) *Attorney, Agent, or Firm* — Cantor Colburn LLP (57) ABSTRACT

A gas turbine engine for an aircraft includes a fan section, a turbine section, a compressor section, and an engine bleed system. The compressor section includes a low compressor stage proximate to the fan section, a high compressor stage axially downstream from the low compressor stage and proximate to the turbine section, and a mid-compressor stage including variable vane assemblies distributed axially between the low and high compressor stage. The engine bleed system includes engine bleed taps with a mid-compressor bleed tap axially between two of the variable vane assemblies, at least one low stage bleed tap axially upstream from the mid-compressor bleed tap, and at least one high stage bleed tap axially downstream from the mid-compressor bleed tap. An external manifold is in pneumatic communication with the mid-compressor bleed tap. A valve system can select one engine bleed tap as a bleed air source for an aircraft use.

18 Claims, 10 Drawing Sheets

(51) Int. Cl.
    *F02C 9/18*     (2006.01)
    *F01D 17/10*     (2006.01)

(56) References Cited

U.S. PATENT DOCUMENTS

| | | | | |
|---|---|---|---|---|
| 5,281,087 | A * | 1/1994 | Hines | F01D 17/162 |
| | | | | 415/160 |
| 5,351,478 | A * | 10/1994 | Walker | F01D 25/26 |
| | | | | 415/144 |
| 6,305,156 | B1 * | 10/2001 | Lui | B64D 13/06 |
| | | | | 454/76 |
| 6,438,941 | B1 | 8/2002 | Elliott et al. | |
| 8,734,091 | B2 | 5/2014 | Moniz et al. | |
| 8,955,794 | B2 * | 2/2015 | Mackin | F02C 6/08 |
| | | | | 244/134 R |
| 9,382,841 | B2 * | 7/2016 | Bruno | F02C 6/08 |
| 9,879,607 | B2 * | 1/2018 | Brunet | F01D 11/02 |
| 2010/0232935 | A1 * | 9/2010 | Twell | F01D 17/162 |
| | | | | 415/151 |
| 2012/0045317 | A1 * | 2/2012 | Saladino | F02C 6/08 |
| | | | | 415/145 |
| 2014/0196470 | A1 * | 7/2014 | Glahn | F01D 11/04 |
| | | | | 60/785 |
| 2015/0159551 | A1 | 6/2015 | Lahmer et al. | |

* cited by examiner

GAS TURBINE ENGINE WITH MID-COMPRESSOR BLEED

BACKGROUND

The subject matter disclosed herein generally relates to gas turbine engines and, more particularly, to a gas turbine engine bleed system with a mid-compressor bleed.

Gas turbine engines are used in numerous applications, one of which is for providing thrust to an aircraft. Compressed air is typically tapped at a high pressure location near the combustor for auxiliary uses, such as environmental control of the aircraft. However, this high pressure air is typically hotter than can safely be supported by ductwork and delivery to the aircraft. Thus, a pre-cooler or heat exchanger is used to cool high-temperature engine bleed air and is typically located near the engine such that excessively hot air is not ducted through the wing of the aircraft or other aircraft sections for safety reasons. Diverting higher pressure and higher temperature air from the engine well beyond the pressure needed reduces engine efficiency. Further, heat exchangers used to cool engine bleed air add to overall aircraft weight, which also reduces fuel burn efficiency. Tap locations for bleed systems are typically constrained due to engine geometry and potential performance impacts.

BRIEF DESCRIPTION

According to one embodiment, a gas turbine engine for an aircraft is provided. The gas turbine engine includes a fan section, a turbine section, a compressor section within a casing, and an engine bleed system. The compressor section includes a low compressor stage proximate to the fan section, a high compressor stage axially downstream from the low compressor stage and proximate to the combustor and turbine section, and a mid-compressor stage including a plurality of variable vane assemblies distributed axially between the low compressor stage and the high compressor stage. The engine bleed system includes a plurality of engine bleed taps comprising a mid-compressor bleed tap axially between two of the variable vane assemblies, at least one low stage bleed tap axially upstream from the mid-compressor bleed tap, and at least one high stage bleed tap axially downstream from the mid-compressor bleed tap. The engine bleed system also includes an external manifold in pneumatic communication with the mid-compressor bleed tap and external to the casing in a mid-compressor bleed flow path between the mid-compressor bleed tap and an aircraft use. The engine bleed system further includes a valve system operable to select one of the engine bleed taps as a bleed air source for the aircraft use.

In addition to one or more of the features described above or below, or as an alternative, further embodiments may include where the aircraft use is an environmental control system of the aircraft.

In addition to one or more of the features described above or below, or as an alternative, further embodiments may include a nacelle inlet anti-icing flow path, where the valve system is operable to route at least a portion of engine bleed air from the bleed air source through the nacelle inlet anti-icing flow path to a nacelle inlet of the gas turbine engine.

In addition to one or more of the features described above or below, or as an alternative, further embodiments may include a wing anti-icing system flow path, where the valve system is operable to route at least a portion of engine bleed air from the bleed air source through the wing anti-icing system flow path to a wing anti-icing system of the aircraft.

In addition to one or more of the features described above or below, or as an alternative, further embodiments may include a fan-air precooler in a flow path between the engine bleed system and an environmental control system of the aircraft as the aircraft use, where the nacelle inlet anti-icing flow path is upstream of the fan-air precooler, and the wing anti-icing system flow path and the environmental control system are downstream of the fan-air precooler.

In addition to one or more of the features described above or below, or as an alternative, further embodiments may include where the external manifold encases at least one of the variable vane assemblies proximate to the mid-compressor bleed tap, and an actuator of the at least one encased variable vane assembly is outside of the external manifold.

In addition to one or more of the features described above or below, or as an alternative, further embodiments may include where the external manifold is split into at least two portions coupled on the casing.

In addition to one or more of the features described above or below, or as an alternative, further embodiments may include an internal manifold radially between an air seal of the compressor section and the casing, where the mid-compressor bleed flow path includes the internal manifold between the mid-compressor bleed tap and the external manifold.

In addition to one or more of the features described above or below, or as an alternative, further embodiments may include where a plurality of instances of the mid-compressor bleed tap are coupled in pneumatic communication with the external manifold through a plurality of bleed lines axially between two of the variable vane assemblies.

In addition to one or more of the features described above or below, or as an alternative, further embodiments may include a buffering flow path in pneumatic communication between the external manifold and a bearing compartment of the gas turbine engine, and can also include where the bearing compartment is sealed with a seal system including a honeycomb seal in series with at least one brush seal.

In addition to one or more of the features described above or below, or as an alternative, further embodiments may include where buffering flow path is in pneumatic communication with the at least one high stage bleed tap.

In addition to one or more of the features described above or below, or as an alternative, further embodiments may include where the bleed air source is routed to the aircraft use through a pylon coupling a nacelle of the gas turbine engine to a wing of the aircraft, and the gas turbine engine includes a geared architecture to drive rotation of the fan section at a lower speed than the compressor section.

According to another embodiment, an engine bleed system for a gas turbine engine of an aircraft is provided. The engine bleed system includes a plurality of engine bleed taps including a mid-compressor bleed tap axially between two of a plurality of variable vane assemblies of a compressor section of the gas turbine engine, at least one low stage bleed tap axially upstream from the mid-compressor bleed tap, and at least one high stage bleed tap axially downstream from the mid-compressor bleed tap. The engine bleed system also includes an external manifold outside of a casing of the gas turbine engine, the external manifold in pneumatic communication with the mid-compressor bleed tap in a mid-compressor bleed flow path between the mid-compressor bleed tap and an aircraft use. The engine bleed system further includes a valve system operable to select one of the engine bleed taps as a bleed air source for the aircraft use.

According to another embodiment, a method is provided of controlling an engine bleed system for a gas turbine engine of an aircraft. The method includes establishing a flow path to a plurality of engine bleed taps including a mid-compressor bleed tap axially between two of a plurality of variable vane assemblies of a compressor section of the gas turbine engine, at least one low stage bleed tap axially upstream from the mid-compressor bleed tap, and at least one high stage bleed tap axially downstream from the mid-compressor bleed tap. A mid-compressor bleed flow path is formed from the mid-compressor bleed tap to an aircraft use through an external manifold in pneumatic communication with the mid-compressor bleed tap, where the external manifold is outside of a casing of the gas turbine engine. A valve system is configured to select one of the engine bleed taps as a bleed air source for the aircraft use. One or more valves of the valve system are selectively opened and closed based on a bleed air demand to control delivery of the bleed air to an aircraft use.

A technical effect of the apparatus, systems and methods is achieved by providing multiple bleed locations in a gas turbine engine including a mid-compressor bleed between two variable vane assemblies as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
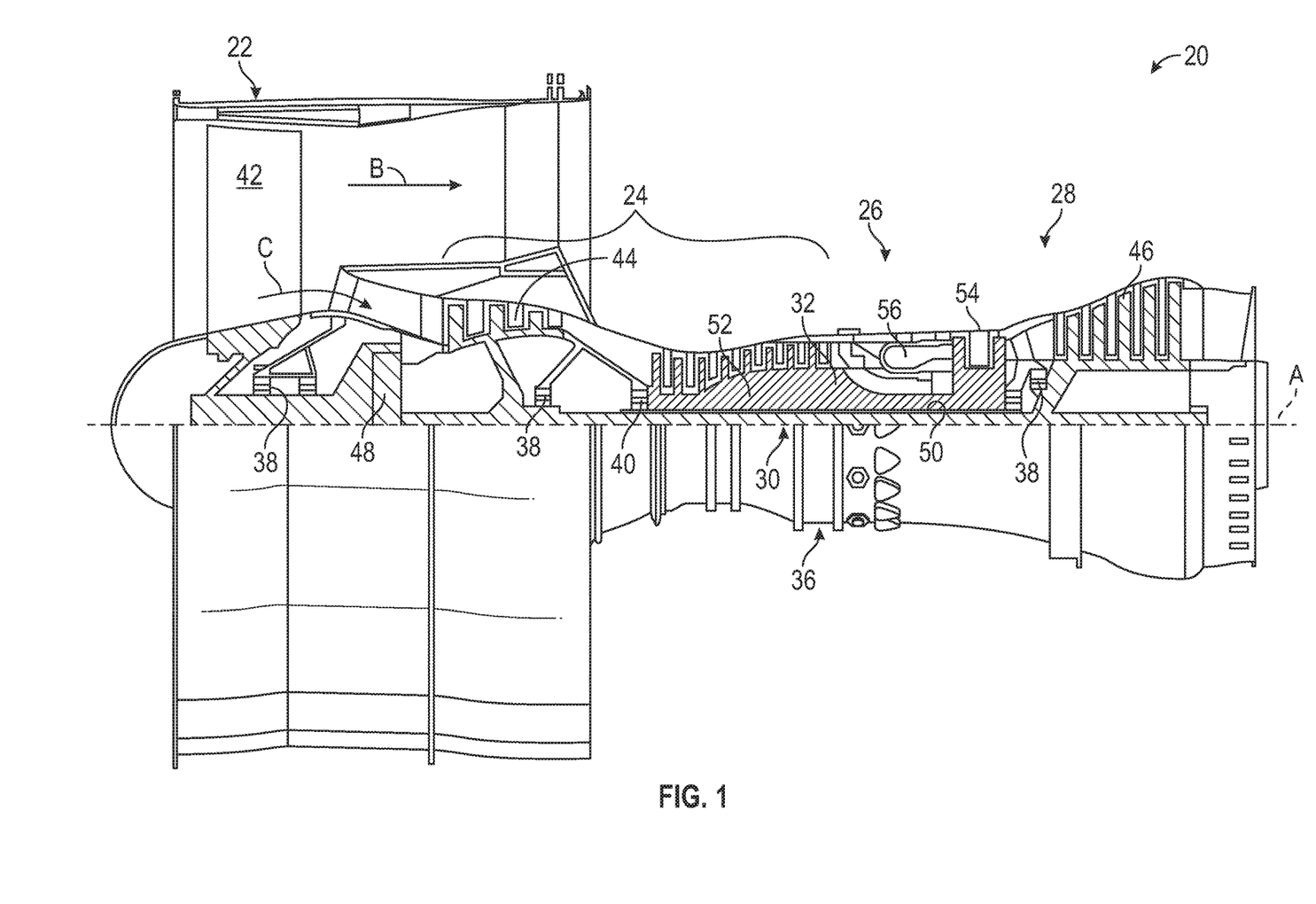
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. The engine 20 includes two turbines 54 and 46 in the turbine section 28 where the last turbine 46 drives the first compressor 44 and the fan drive gear system 48 which drives the fan 42. The compressor section 24 has two distinct compressors, the low compressor 44 and the high pressure compressor 52. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150 ft/second (350.5 m/sec).

Figure 2:
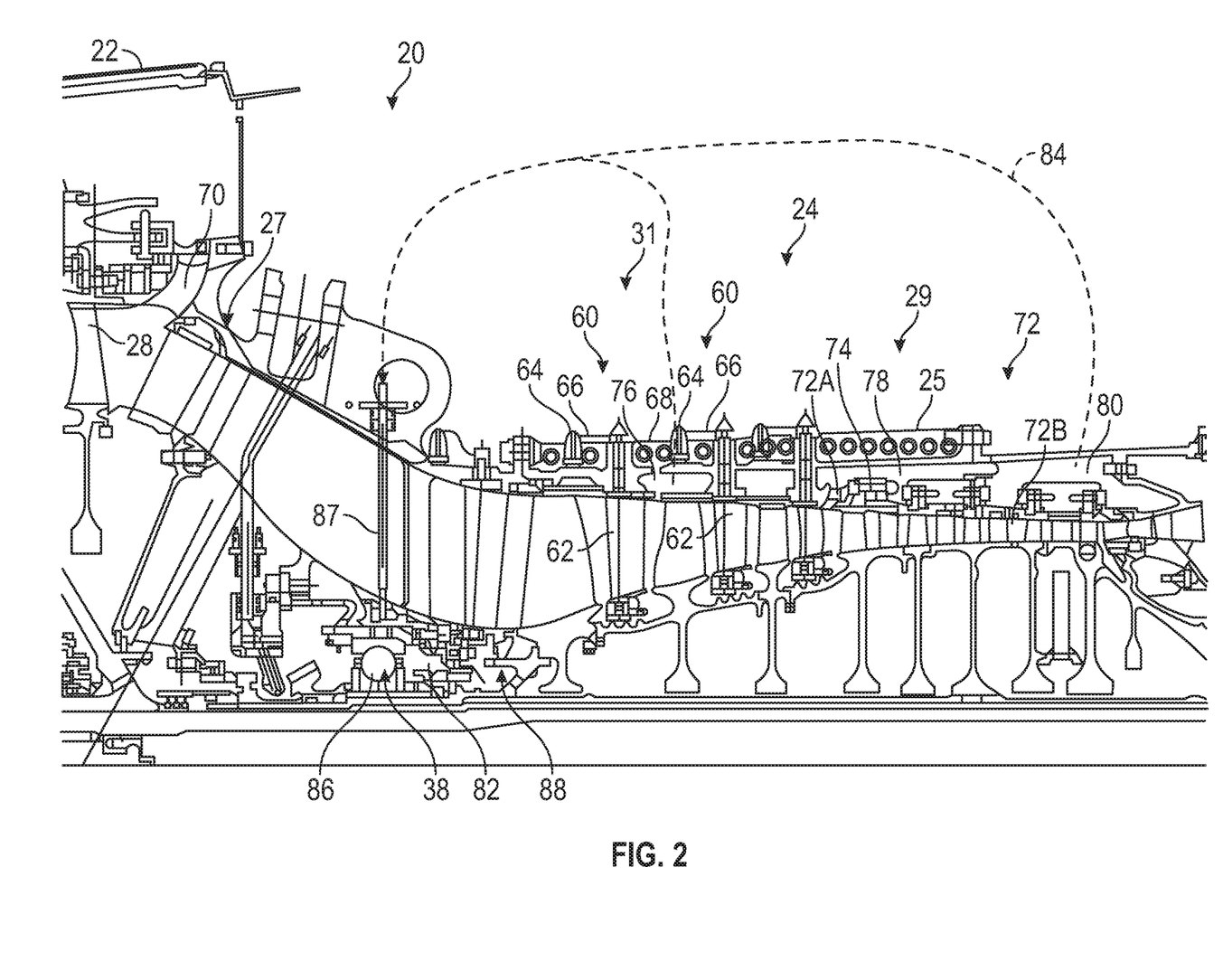
FIG. 2 is a partial cross-sectional illustration of a portion of a gas turbine engine, in accordance with an embodiment of the disclosure.

FIG. 2 depicts an embodiment of a portion of the gas turbine engine 20 in greater detail. The compressor section 24 is surrounded by a casing 25. The compressor section 24 includes at least one low compressor stage 27 proximate to the fan section 22. The low compressor stage 27 includes a low compressor stage stator and a low compressor stage rotor, and can be a portion of the low pressure compressor 44 of FIG. 1. The compressor section 24 also includes at least one high compressor stage 29 axially downstream from the low compressor stage 27 and proximate to the combustor 56 and turbine section 28 of FIG. 1. The high compressor stage 29 can be a portion of the high pressure compressor 52 of FIG. 1. The compressor section 24 also includes at least one mid-compressor stage 31 between the low compressor stage 27 and the high compressor stage 29. The mid-compressor stage 31 includes a plurality of variable vane assemblies 60 distributed axially and radially. Each of the variable vane assemblies 60 includes a variable vane 62 operable to rotate and adjust a vane angle to control flow performance through the mid-compressor stage 31. Rotation of each variable vane 62 is controlled through a unison ring 64 and vane arm assembly 66. Each of the variable vane assemblies 60 at a common axial location is rotated together through motion of a shared instance of the unison ring 64.

In embodiments, three or more engine bleed locations can be selectively accessed for an aircraft use. In the example of FIG. 2, engine bleed locations can include a mid-compressor bleed location 68 axially between two of the variable vane assemblies 60, at least one low stage bleed location 70 axially upstream from the mid-compressor bleed location 68, and at least one high stage bleed location 72 axially downstream from the mid-compressor bleed location 68. In the example of FIG. 2, there are two high stage bleed locations 72A, 72B axially spaced to provide different levels of pressure and temperature depending on the needs of the aircraft use and the engine power level as set according to the engine thrust needed by the aircraft according to operating conditions. An air seal 74 defines an internal boundary of the core flow path C of FIG. 1 and provides an internal manifold space with respect to the casing 25. Thus, with respect to bleed location 72A, an internal manifold 78 is radially defined between the air seal 74 of the compressor section 24 and the casing 25. Similarly, an internal manifold 80 is defined at the high stage bleed location 72B between the air seals located at the outer part of the compressor flow path and the casing 25. An internal manifold 76 can be located proximate the mid-compressor bleed location 68 radially defined within the casing 25.

Figure 11:
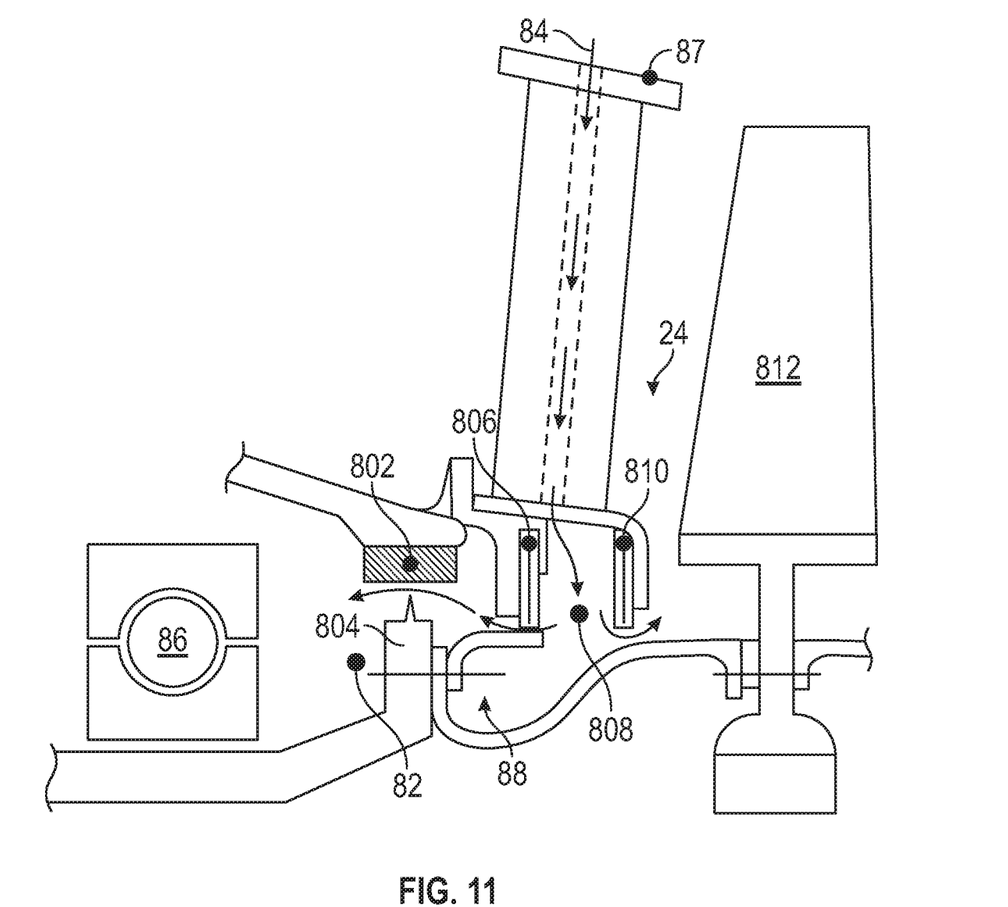
FIG. 11 is a schematic view of a seal system according to an embodiment of the disclosure.

In the example of FIG. 2, one or more bearing compartments extending forward from bearing compartment 82 of the gas turbine engine 20 can be buffered with engine bleed air from the mid-compressor bleed location 68 and/or other locations, such as high stage bleed locations 72A, 72B through one or more flow path 84, to maintain a positive pressure differential on the air and oil mist around the bearings 86 in one or more bearing systems 38. Thus, the buffer flow path 84 can receive compressed air from the internal manifold 76 and may also receive compressed air from the internal manifold 80. The flow path 84 can include a static structure 87, such as a tube or vane. Bearing compartment 82 can be sealed with a seal system 88 (as best seen in FIG. 11). The seal system 88 can include a honeycomb seal land 802 and a rotating knife-edge seal member 804 in combination with at least one brush seal 806, for example. Pressure applied by engine bleed air to bearing compartment 82 prevents oil leakage from the bearing compartment 82 by providing an artificial space of high pressure to a buffer space 808. The buffer space 808 can be formed between brush seal 806 and brush seal 810 that provide air flow leakage paths to the bearing compartment 82 and to a gas path within the compressor section 24 proximate to a rotating structure 812, such as a blade and disk of mid-compressor stage 31. The combination of engine bleed air from the flow path 84 and the seal system 88 can keep the buffer pressure high while also preventing too much airflow into the bearing compartment 82, which could be detrimental to engine performance and also, excess air could tax an air-oil separation system on the engine 20.

Figure 3:
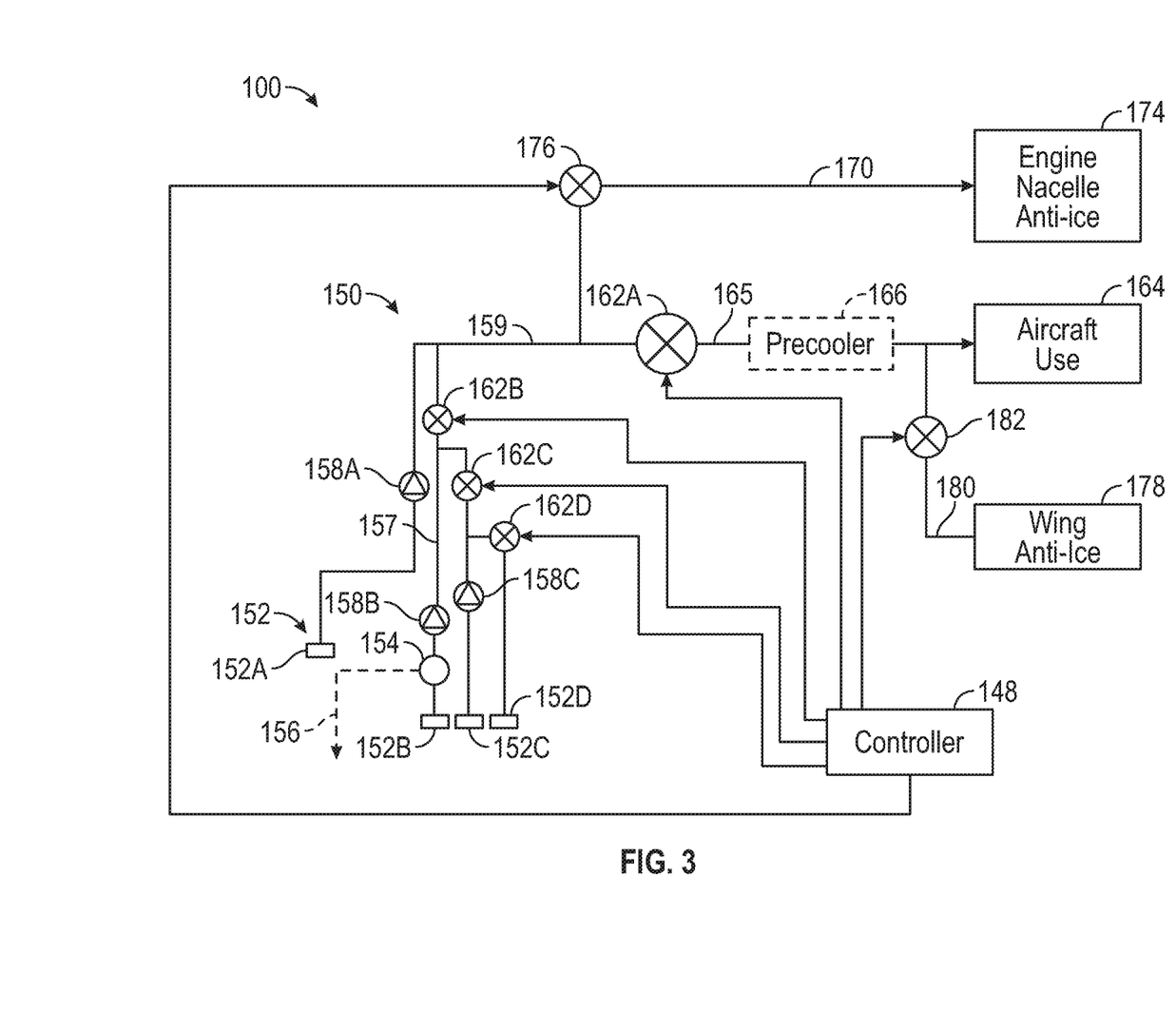
FIG. 3 is a schematic view of an engine bleed system according to an embodiment of the disclosure.

FIG. 3 is a schematic view of an engine bleed system 100 that can be integrated with the gas turbine engine 20 of FIGS. 1 and 2 according to an embodiment. In the example of FIG. 3, the engine bleed system 100 includes a plurality of engine bleed taps 152A, 152B, 152C, 152D within the gas turbine engine 20. Although the example of FIG. 3 depicts four engine bleed taps 152A-152D, it will be understood that three or more engine bleed taps 152 are contemplated in embodiments. Engine bleed tap 152A is at an upstream location with respect to engine bleed taps 152B-152D and thus provides a source of lower compression and cooler bleed air as compared to bleed air extracted from engine bleed taps 152B-152D. Similarly, engine bleed tap 152B is at an upstream location with respect to engine bleed taps 152C-152D and thus provides a source of lower compression and cooler bleed air as compared to bleed air extracted from engine bleed taps 152C-152D. Engine bleed tap 52D is at a downstream location with respect to engine bleed taps 152A-152C and thus provides a source of higher compression and hotter bleed air as compared to bleed air extracted from engine bleed taps 152A-152C. In some embodiments, at least one of the engine bleed taps 152A-152D has a maximum bleed temperature below an auto-ignition point of a fuel-air mixture of the aircraft at idle engine power at a maximum aircraft altitude and a pressure suitable for pressurizing an aircraft 775 (FIG. 10) at the maximum aircraft altitude, and at least one of the engine bleed taps 152A-152D can have a maximum bleed temperature below the auto-ignition point of the fuel-air mixture of the aircraft 775 at a highest engine power operation and a pressure suitable for pressurizing the aircraft 775.

Engine bleed tap 152A may also be referred to as a low stage bleed tap at low stage bleed location 70 of FIG. 2 and can be selected when the gas turbine engine 20 is operating a higher power level (e.g., takeoff power). Engine bleed tap 152B may also be referred to as a mid-compressor bleed tap at mid-compressor bleed location 68 of FIG. 2 and can be selected when operating the gas turbine engine 20 at an intermediate power level (e.g., cruise power). Either or both of the engine bleed taps 152C and 152D can be referred to as a high stage bleed tap at a high stage bleed location 72 (e.g., high stage bleed locations 72A, 72B of FIG. 2) and can be selected when the gas turbine engine 20 is operating a lower power level (e.g., idle power).

Figure 10:
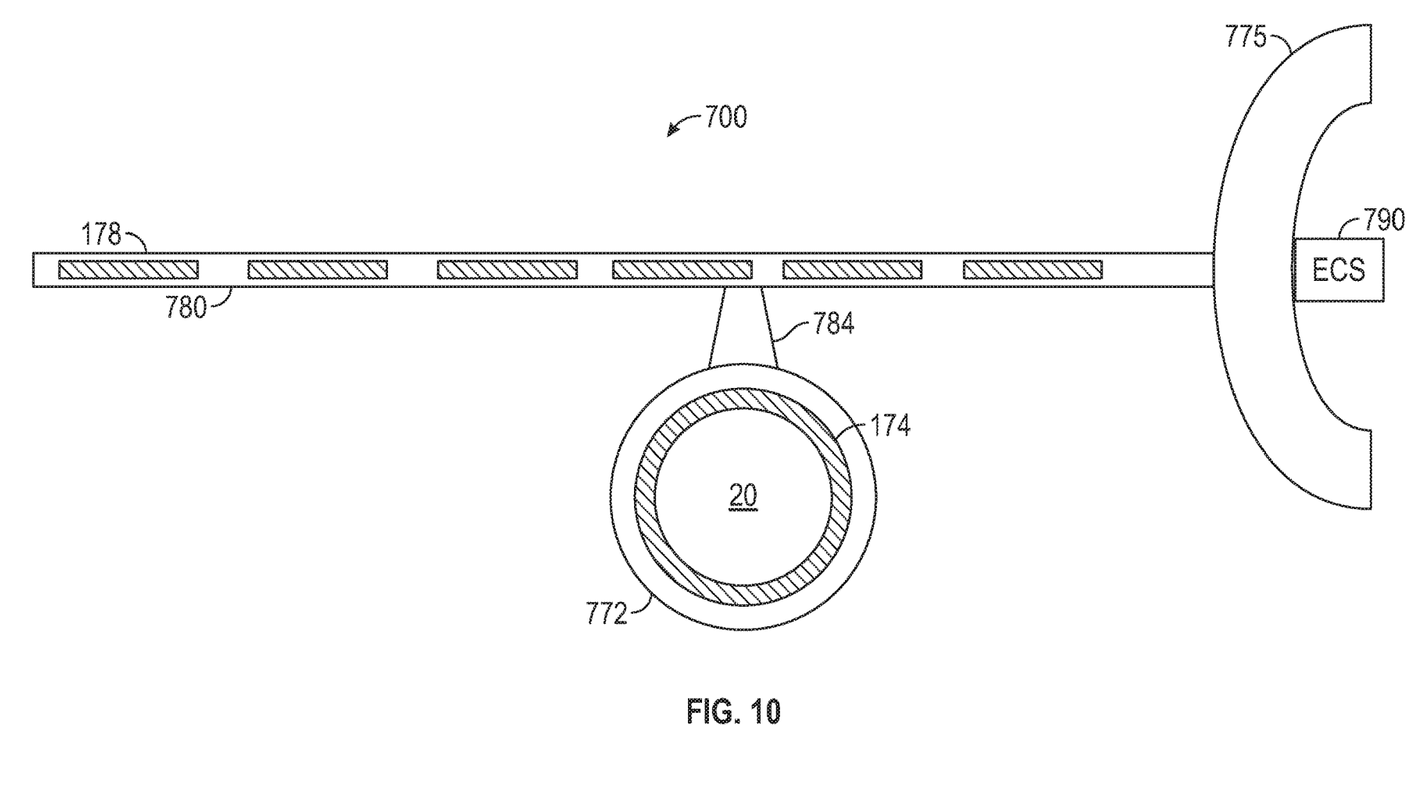
FIG. 10 is a schematic view of an aircraft ice control system according to an embodiment of the disclosure.

A valve system 150 can be used to select one of the engine bleed taps 152A-152D as a bleed air source for aircraft use 164. The valve system 150 can include a multi-port selection valve or a plurality of individual valves. In the example of FIG. 3, bleed air from engine bleed tap 152A is routed through a check valve 158A to an intermediate duct 159. A valve 162A can control delivery of the bleed air from the intermediate duct 159 to the aircraft use 164 through a trunk duct 165. Optionally, a fan-air precooler 166 may be interposed in a flow path between the trunk duct 165 of the engine bleed system 100 and the aircraft use 164. Valve 162A can be a shutoff valve or a combined pressure regulating and shutoff valve. The aircraft use 164 may be an environmental control system 790 of aircraft 775, as best seen in FIG. 10. Engine bleed air from engine bleed tap 152B can be routed through an external manifold 154 to check valve 158B to intermediate duct 159 as controlled by valve 162B as part of a mid-compressor bleed flow path 157 to the aircraft use 164. A portion of engine bleed air from the external manifold 154 can be routed through a buffering flow path 156 to a bearing compartment 82 (FIG. 2), where the buffering flow path 156 is in pneumatic communication with the external manifold 154 and the bearing compartment 82. Engine bleed air from engine bleed tap 152C can be routed through check valve 158C to intermediate duct 159 as controlled by valves 162B and 162C. Engine bleed air from engine bleed tap 152D can be routed to intermediate duct 159 as controlled by valves 162B, 162C, and 162D. Other configurations of the valve system 150 are contemplated, including different valve arrangements with a greater or lesser number of valves. For example, rather than cascading valves 162B-162D, valve 162C and/or valve 162D can be directly connected to intermediate duct 159.

In embodiments, a nacelle inlet anti-icing flow path 170 for engine or nacelle anti-icing of the gas turbine engine 20 is provided as part of an anti-icing system 700 (FIG. 10) that includes an engine anti-icing system 174. The engine anti-icing system 174 can provide anti-icing for engine components and/or nacelle components (e.g., inlet of nacelle 772 of FIG. 10) and can exceed 400 degrees Fahrenheit (204 degrees Celsius) in some embodiments. Although depicted as being connected to the intermediate duct 159, the nacelle inlet anti-icing flow path 170 can be coupled to one or more different locations in the engine bleed system 100. A valve 176 can be selectively actuated by a controller 148 to enable the engine anti-icing system 174. The anti-icing system 700 of FIG. 10 can also include a wing anti-icing system 178. In some embodiments, the wing anti-icing system 178 in wing 780 of the aircraft 775 of FIG. 10 can receive engine bleed air through a wing anti-icing system flow path 180 of FIG. 3. For example, the controller 148 can control delivery of a portion of engine bleed air to the wing anti-icing system 178 of the aircraft 775 using valve 182. The controller 148 may also control valves 162A-162D, as well as other components.

The controller 148 can include memory to store instructions that are executed by a processor. The executable instructions may be stored or organized in any manner and at any level of abstraction, such as in connection with a controlling and/or monitoring operation of one or more systems of the gas turbine engine 20 of FIG. 1. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The controller 148 can be embodied in an individual line-replaceable unit, within a control system (e.g., in an electronic engine control), and/or distributed between multiple electronic systems.

In the example of FIG. 3, source locations of the engine bleed taps 152A-152D can be selected to hold a maximum temperature of the bleed air below an auto-ignition point of a fuel-air mixture at all flight conditions of the gas turbine engine 20 where the fan-air precooler 166 is omitted. For instance, the maximum temperature for the furthest most upstream bleed location can be established as 400 degrees Fahrenheit (204 degrees Celsius) for the engine 20 operating at full thrust allowed by the engine control with the aircraft at 0.25 mach and on a 120 degree Fahrenheit day which is typically at or about a maximum temperature point for compressor locations on the engine 20. The controller 148 may observe various aircraft operating conditions to determine pressures and temperatures at each of the engine bleed taps 152A-152D and selectively open and close valves 162A-162D based on a bleed air demand and control delivery of the bleed air to aircraft use 164 and/or anti-icing systems 174, 178 where also, under this condition the controller 148 may limit the anti-icing flow down to about zero to protect the aircraft and nacelle from damage under conditions where the pilot has selected anti-icing but the control logic determines that icing is not possible. In embodiments where the fan-air precooler 166 is included in a flow path (e.g., coupled to trunk duct 165) between the engine bleed system 100 and the aircraft use 164, the nacelle inlet anti-icing flow path 170 can be upstream of the fan-air precooler 166, and the wing anti-icing system flow path 180 and the aircraft use 164 (e.g., environmental control system) can be downstream of the fan-air precooler 166.

A number of considerations may be evaluated to determine whether the fan-air precooler 166 is included. One consideration on the bleed source is that the nacelle lip cannot be damaged. For example, there can be a 450 deg. F. limit to the bleed source by design and/or by valve manipulation. For wing anti-ice and cabin pressure, the wing may be prohibited from receiving air over 400 deg. F., so if the three or more bleeds cannot be switched such that 400 deg. F. is achieved on one of them, then the fan-air precooler 166 would be needed. For wing anti-ice and cabin pressure where one of the taps is below 400 deg. F. at take-off through up to the service ceiling of the aircraft, the fan-air precooler 166 can be omitted.

While a specific configuration is depicted in FIG. 3, other configurations are contemplated within the scope of embodiments. For instance, the valve 182 may be located upstream of one or more of valves 162A-162D. Further, output of one or more of the engine bleed taps 152A-152D may have other uses and/or connections with the wing anti-ice system 178 and/or other systems. The valve system 150 may be located proximate to the gas turbine engine 20, below or within a pylon 784 (FIG. 10) that couples a nacelle 772 of the gas turbine engine 20 to wing 780, or within the aircraft 775.

Figure 4:
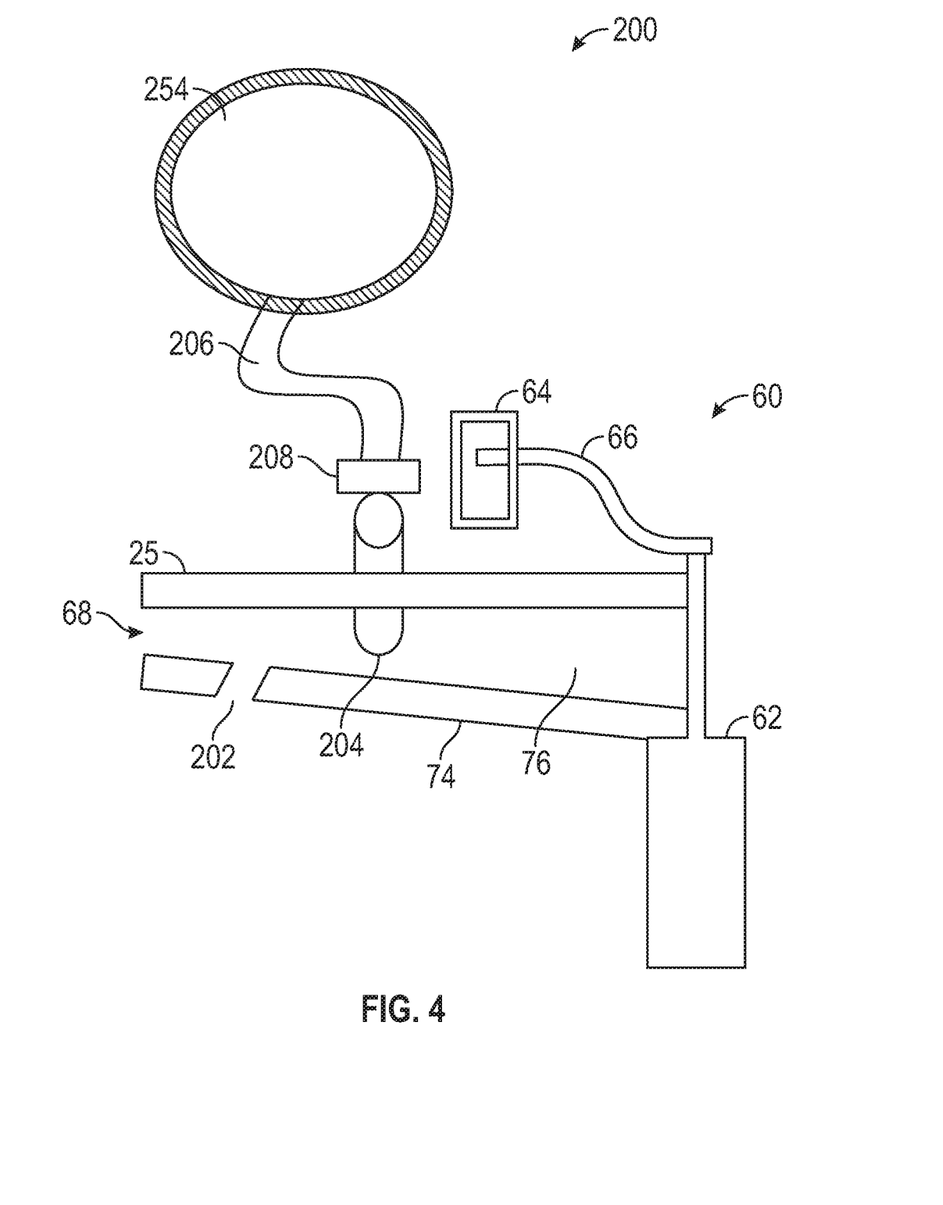
FIG. 4 is a schematic view of a mid-compressor bleed configuration according to an embodiment of the disclosure.

FIG. 4 is a schematic view of a mid-compressor bleed configuration 200 according to an embodiment at the mid-compressor bleed location 68 of gas turbine engine 20 of FIGS. 1 and 2. The engine bleed tap 152B (mid-compressor bleed tap) is embodied as an aperture 202 in the air seal 74 in combination with a port 204 that provides an engine bleed flow path via a bleed line 206 through the casing 25 to an external manifold 254 as an embodiment of the external manifold 154 of FIG. 3. The bleed line 206 may be coupled to the port 204 using a nut 208 or other means of attachment. The bleed line 206 can be curved to route around neighboring instances of the variable vane assembly 60 and to modify aspects of the engine bleed flow passing to the external manifold 254. The external manifold 254 is depicted as a cross-section in FIG. 4, where the external manifold 254 can be formed as a full 360 degree ring about the casing 25 or may be split into at least two portions coupled on the casing 25. A plurality of instances of the mid-compressor bleed tap 152B can be coupled in pneumatic communication with the external manifold 254 through a plurality of bleed lines 206 axially between two of the variable vane assemblies 60.

Figure 5:
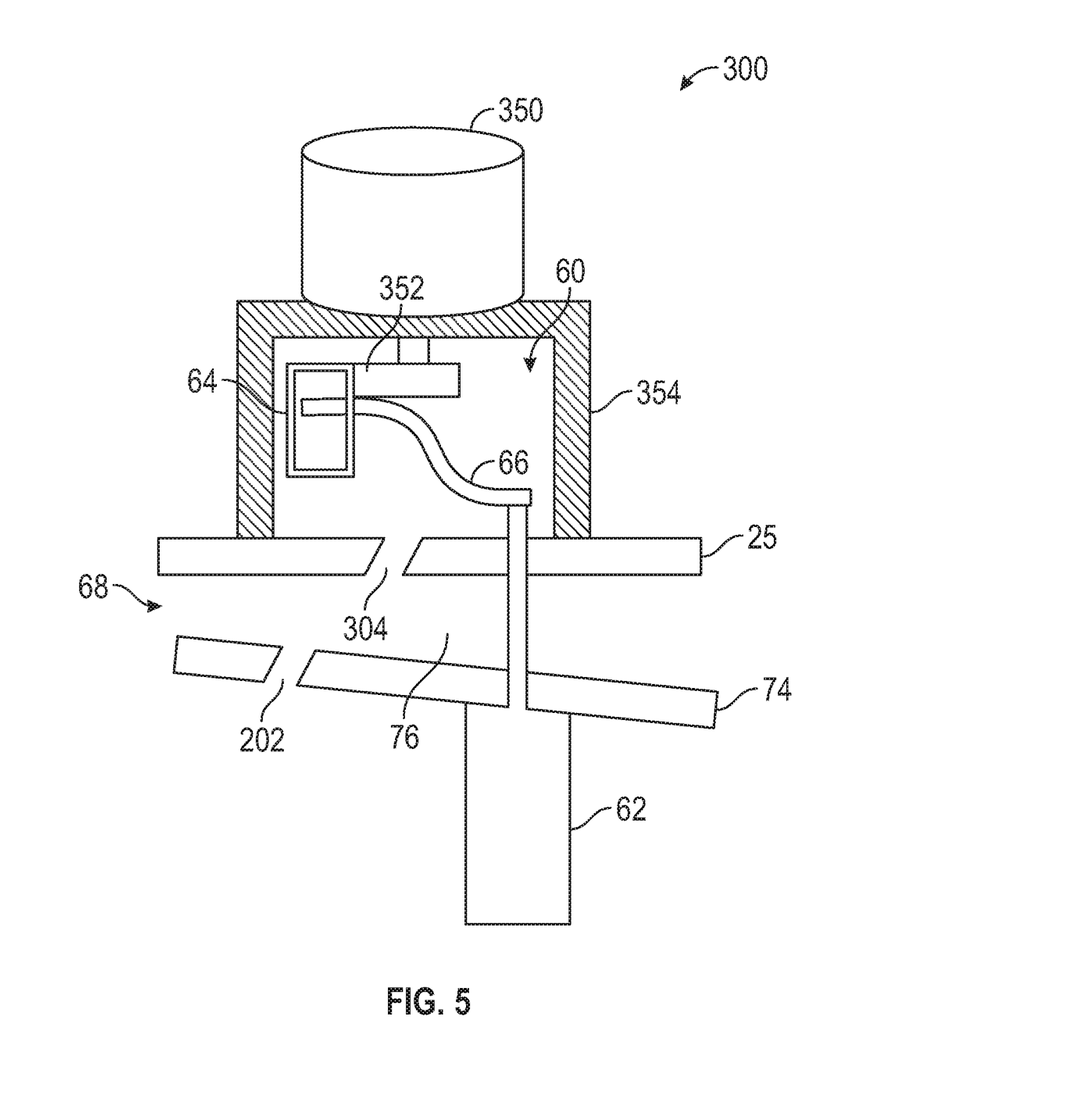
FIG. 5 is a schematic view of a mid-compressor bleed configuration according to an embodiment of the disclosure.

FIG. 5 is a schematic view of a mid-compressor bleed configuration 300 according to an embodiment at the mid-compressor bleed location 68 of gas turbine engine 20 of FIGS. 1 and 2. The engine bleed tap 152B (mid-compressor bleed tap) is embodied as an aperture 202 in the air seal 74 in combination with an aperture 304 that provides an engine bleed flow path through the casing 25 to an external manifold 354 as an embodiment of the external manifold 154 of FIG. 3. The external manifold 354 encases at least one of the variable vane assemblies 60 proximate to the engine bleed tap 152B. An actuator 350 of the at least one encased variable vane assembly 60 can be outside of the external manifold 354 as depicted in the example of FIG. 5. The actuator 350 can be operably coupled through a linkage 352 to drive motion of the unison ring 64 within the external manifold 354. In some embodiments, the linkage 352 can extend the distance between the actuator 350 and the unison ring 64 such that the actuator 350 need not be directly in contact with the external manifold 354. The actuator 350 can be any type of electro-mechanical, hydro-mechanical, or other actuator type known in the art. The external manifold 354 is depicted as a cross-section in FIG. 5, where the external manifold 354 can be formed as a full 360 degree structure about the casing 25 or may be split into at least two portions coupled on the casing 25.

Figure 6:
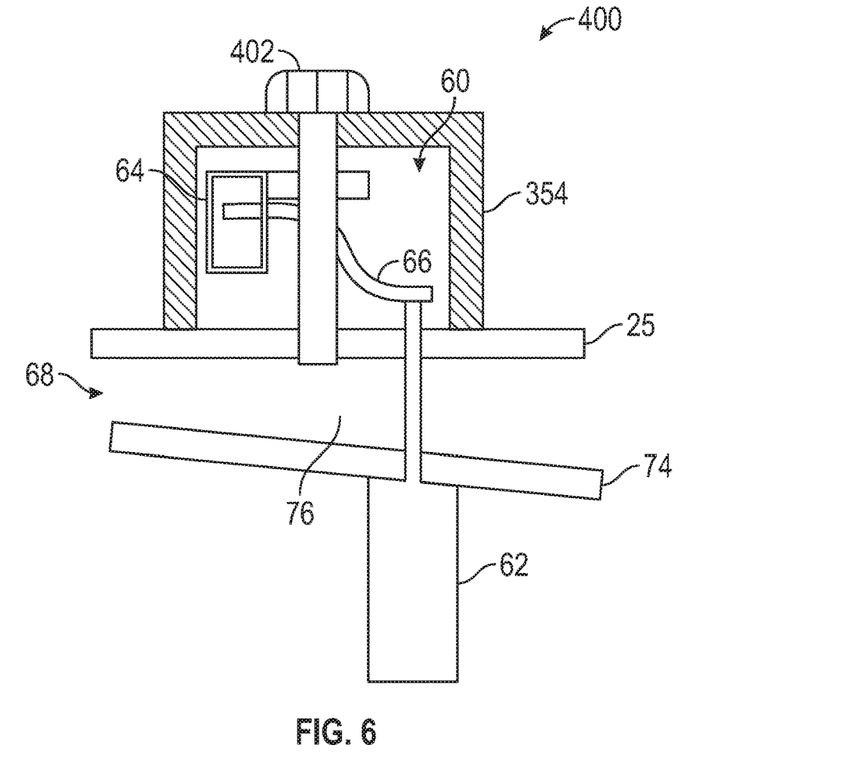
FIG. 6 is a schematic view of a mid-compressor bleed configuration according to an embodiment of the disclosure.
Figure 7:
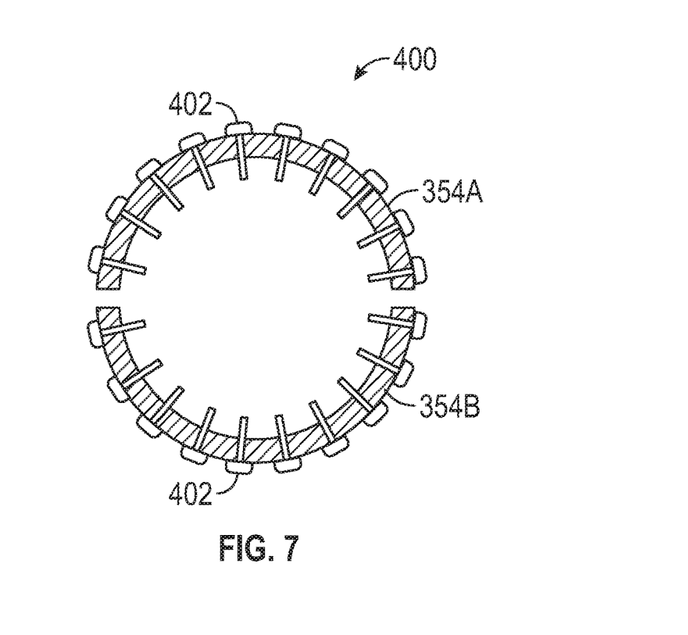
FIG. 7 is a schematic view of an external manifold attachment system according to an embodiment of the disclosure.

FIG. 6 is a schematic view of a mid-compressor bleed configuration 400 according to an embodiment at the mid-compressor bleed location 68 of gas turbine engine 20 of FIGS. 1 and 2. FIG. 6 depicts an example of an attachment system that includes a plurality of fasteners 402 to retain the external manifold 354 to the casing 25. The fasteners 402 can be bolts or other similar mechanical fastening devices. The fasteners 402 may be distributed radially around the external manifold 354 as depicted in FIG. 7, where the external manifold 354 is depicted in two portions 354A, 354B. Other fastening arrangements are contemplated to couple the external manifold 354 to the casing 25. It is understood that additional elements, such as seals, can be installed between the external manifold 354 and the casing 25.

Figure 8:
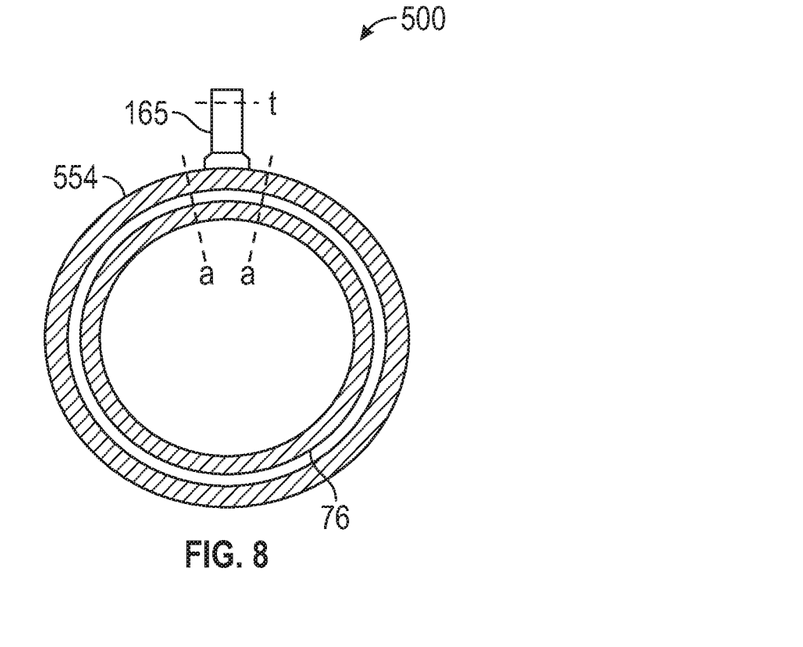
FIG. 8 is a schematic view of a multiple manifold system according to an embodiment of the disclosure.
Figure 9:
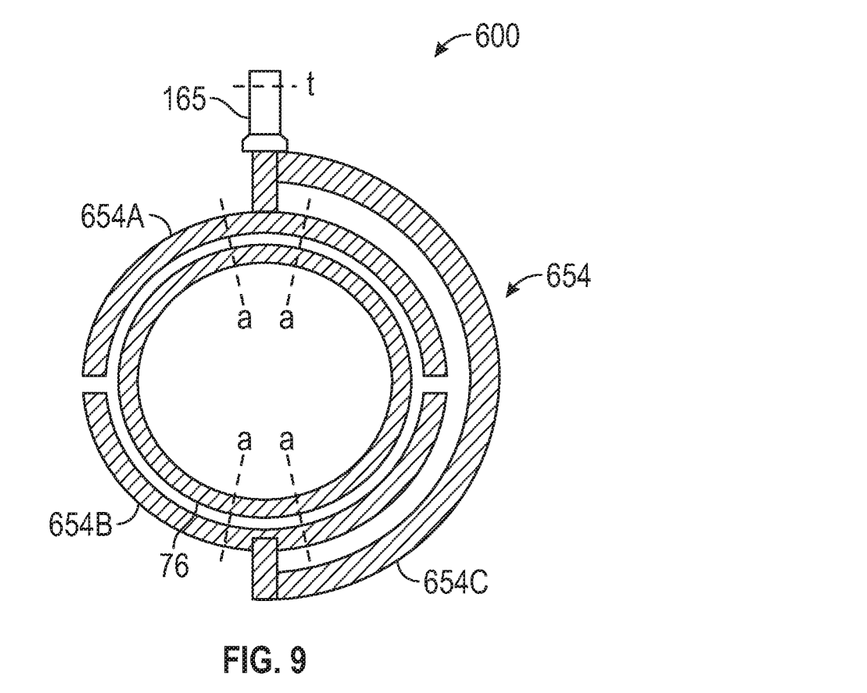
FIG. 9 is a schematic view of a multiple manifold system according to an embodiment of the disclosure.

FIGS. 8 and 9 depict two examples of multiple manifold systems 500, 600 for linking the engine bleed tap 152B (mid-compressor bleed tap) to the trunk duct 165. Elements such as valves 158B, 162B, 162A and associated ducting are omitted from the examples of FIGS. 8 and 9 for purposes of explanation. A multiple manifold system 500 includes the internal manifold 76 and an external manifold 554 as an embodiment of the external manifold 154 of FIG. 3, where the external manifold 554 is in pneumatic communication with the internal manifold 76 and the trunk duct 165. The internal manifold 76 and the external manifold 554 can be designed with a cross-sectional flow area of "a", and the trunk duct 165 can be designed with a cross-sectional flow area of "t". To manage pressure change differences, the combined cross-sectional flow area of "a" may be designed as at least twice the cross-sectional flow area as "t". In some embodiments, the combined cross-sectional flow area of "a" may be up to eight times larger than "t" to reduce pressure variation impacts on compressor blades in close proximity to the trunk line which in FIGS. 8 and 9 is indicated as trunk duct 165. The designer may consider the low static pressure at the trunk duct 165 to be detrimental to compressor durability if that low pressure propagates through to the gas path and causes periodic strumming of each blade as it passes the low pressure region. To counter that effect, FIGS. 8 and 9 illustrate how the area "a" can be multiplied to be several times "t" by dividing the circumferential duct in multiple segments that provide multiple chances for the manifolds to attenuate any low static pressure seen at the trunk line. The use of the external manifold 554 in combination with the space constrained size of the internal manifold 76 allows for higher ratios of total "a" to "t" to be realized. In the example of the multiple manifold system 600 of FIG. 9, an external manifold 654 is divided into multiple external manifold portions 654A, 654B as linked by external manifold portion 654C, where the external manifold 654 is an embodiment of the external manifold 154 of FIG. 3. The use of multiple external manifold portions 654A-654C provides additional cross-sectional flow area "a" to further increase the ratio of total "a" to "t" without modifying the cross-sectional flow area of the internal manifold 76 and use the multiple tangential flows set up at each "a" location to thereby mask the gas path from the influence of the low pressure at the trunk duct 165 and reduce the intensity of the low static pressure region strumming occurring in the flow path at the trunk duct 165.

Figure 12:
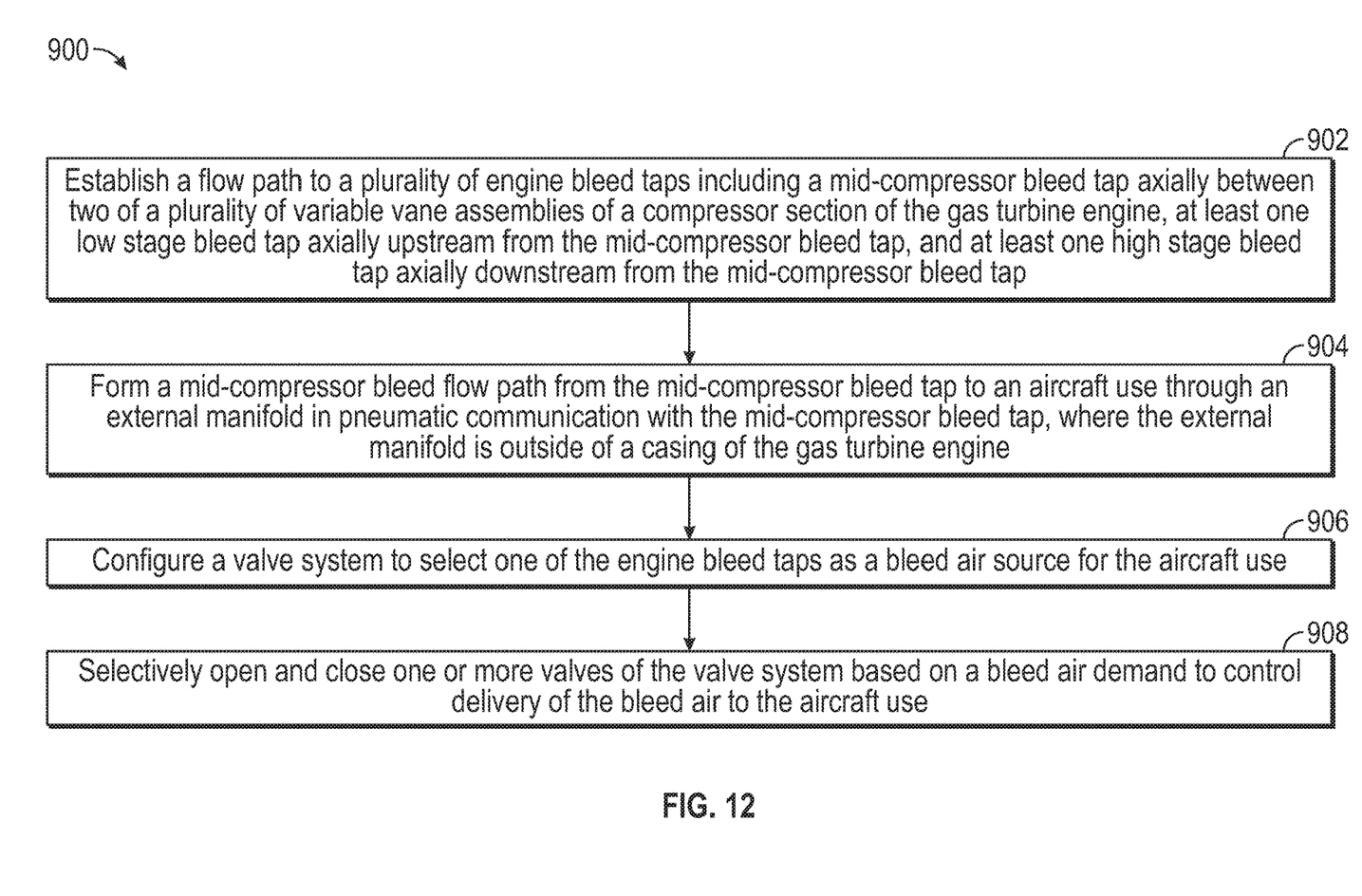
FIG. 12 is a process flow of a method according to embodiments of the disclosure.

FIG. 12 is a process flow of a method 900 of controlling an engine bleed system 100 for a gas turbine engine 20 of an aircraft 775 according to an embodiment. The method 900 is described with reference to FIGS. 1-12. Although described primarily in reference to the gas turbine engine 20 of FIG. 1, it will be understood that the method 900 can also be applied to gas turbine engines with other configurations including a two turbine rotor and a two compressor rotor turbofan absent a speed change mechanism.

At block 902, a flow path including, for example, the intermediate duct 159 and trunk duct 165, is established to a plurality of engine bleed taps 152A-152D including a mid-compressor bleed tap 152B axially between two of a plurality of variable vane assemblies 60 of a compressor section 24 of the gas turbine engine 20, at least one low stage bleed tap 152A axially upstream from the mid-compressor bleed tap 152B, and at least one high stage bleed tap 152C, 152D axially downstream from the mid-compressor bleed tap 152B. At block 904, a mid-compressor bleed flow path 157 is formed from the mid-compressor bleed tap 152B to an aircraft use 164 through an external manifold 154 in pneumatic communication with the mid-compressor bleed tap 152B, where the external manifold 154 is outside of a casing 25 of the gas turbine engine 20. At block 906, a valve system 150 is configured to select one of the engine bleed taps 152A-152D as a bleed air source for the aircraft use 164. At block 908, one or more valves of the valve system 150 are selectively opened and closed based on a bleed air demand to control delivery of the bleed air to an aircraft use 164. A buffering flow path 156 can also be established in pneumatic communication between the external manifold 154 and a bearing compartment 82 of the gas turbine engine 20. Delivery of a portion of bleed air to an anti-icing system 700 of the aircraft 775 can be controlled through the engine bleed system 100 using, for example, the controller 148 and valve system 150 of FIG. 3.

While the above description has described the flow process of FIG. 12 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine for an aircraft, the gas turbine engine comprising:
    a fan section;
    a turbine section;
    a combustor;
    a compressor section within a casing, the compressor section comprising a low compressor stage proximate to the fan section, a high compressor stage axially downstream from the low compressor stage and proximate to the combustor and turbine section, and a mid-compressor stage comprising a plurality of variable vane assemblies distributed axially between the low compressor stage and the high compressor stage; and
    an engine bleed system comprising:
        a plurality of engine bleed taps comprising a mid-compressor bleed tap axially between two of the plurality of variable vane assemblies, at least one low stage bleed tap axially upstream from the mid-compressor bleed tap, and at least one high stage bleed tap axially downstream from the mid-compressor bleed tap;
        an external manifold in pneumatic communication with the mid-compressor bleed tap and external to the casing in a mid-compressor bleed flow path between the mid-compressor bleed tap and an aircraft system, wherein the external manifold encases a unison ring and vane arm assembly of at least one of the plurality of variable vane assemblies proximate to the mid-compressor bleed tap, and an actuator of the at least one encased variable vane assembly is outside of the external manifold; and
        a valve system operable to select one of the engine bleed taps as a bleed air source for the aircraft system.

2. The gas turbine engine as in claim 1, wherein the aircraft system is an environmental control system of the aircraft.

3. The gas turbine engine as in claim 1, further comprising a nacelle inlet anti-icing flow path, wherein the valve system is operable to route at least a portion of engine bleed air from the bleed air source through the nacelle inlet anti-icing flow path to a nacelle inlet of the gas turbine engine.

4. The gas turbine engine as in claim 3, further comprising a wing anti-icing system flow path, wherein the valve system is operable to route at least a second portion of engine bleed air from the bleed air source through the wing anti-icing system flow path to a wing anti-icing system of the aircraft.

5. The gas turbine engine as in claim 4, further comprising a fan-air precooler in a flow path between the engine bleed system and an environmental control system of the aircraft as the aircraft system, wherein the nacelle inlet anti-icing flow path is upstream of the fan-air precooler, and the wing anti-icing system flow path and the environmental control system are downstream of the fan-air precooler.

6. The gas turbine engine as in claim 1, wherein the external manifold is split into at least two portions coupled on the casing.

7. The gas turbine engine as in claim 1, further comprising an internal manifold radially between an air seal of the compressor section and the casing, wherein the mid-compressor bleed flow path includes the internal manifold between the mid-compressor bleed tap and the external manifold.

8. The gas turbine engine as in claim 1, wherein the mid-compressor bleed tap comprises one of a plurality of mid-compressor bleed taps that are coupled in pneumatic communication with the external manifold through a plurality of bleed lines axially between two of the plurality of variable vane assemblies.

9. The gas turbine engine as in claim 1, further comprising a buffering flow path in pneumatic communication between the external manifold and a bearing compartment of the gas turbine engine, and the bearing compartment is sealed with a seal system comprising a honeycomb seal in series with at least one brush seal.

10. The gas turbine engine as in claim 9, wherein the buffering flow path is in pneumatic communication with the at least one high stage bleed tap.

11. The gas turbine engine as in claim 1, wherein the bleed air source is routed to the aircraft system through a pylon coupling a nacelle of the gas turbine engine to a wing of the aircraft, and the gas turbine engine comprises a geared architecture to drive rotation of the fan section at a lower speed than the compressor section.

12. An engine bleed system for a gas turbine engine of an aircraft, the engine bleed system comprising:
  a plurality of engine bleed taps comprising a mid-compressor bleed tap axially between two of a plurality of variable vane assemblies of a compressor section of the gas turbine engine, at least one low stage bleed tap axially upstream from the mid-compressor bleed tap, and at least one high stage bleed tap axially downstream from the mid-compressor bleed tap;
  an external manifold outside of a casing of the gas turbine engine, the external manifold in pneumatic communication with the mid-compressor bleed tap in a mid-compressor bleed flow path between the mid-compressor bleed tap and an aircraft system, wherein the external manifold encases a unison ring and vane arm assembly of at least one of the plurality of variable vane assemblies proximate to the mid-compressor bleed tap, and an actuator of the at least one encased variable vane assembly is outside of the external manifold; and
  a valve system operable to select one of the engine bleed taps as a bleed air source for the aircraft system.

13. The engine bleed system as in claim 12, further comprising:
  a nacelle inlet anti-icing flow path, wherein the valve system is operable to route at least a portion of engine bleed air from the bleed air source through the nacelle inlet anti-icing flow path to a nacelle inlet of the gas turbine engine; and
  a wing anti-icing system flow path, wherein the valve system is operable to route at least a second portion of engine bleed air from the bleed air source through the wing anti-icing system flow path to a wing anti-icing system of the aircraft.

14. The engine bleed system as in claim 12, further comprising an internal manifold radially between an air seal of the compressor section and the casing, wherein the mid-compressor bleed flow path includes the internal manifold between the mid-compressor bleed tap and the external manifold, and the external manifold is split into at least two portions coupled on the casing.

15. The engine bleed system as in claim 12, wherein the mid-compressor bleed tap comprises one of a plurality of mid-compressor bleed taps that are coupled in pneumatic communication with the external manifold through a plurality of bleed lines axially between two of the plurality of variable vane assemblies.

16. A method of controlling an engine bleed system for a gas turbine engine of an aircraft, the method comprising:
  establishing a flow path to a plurality of engine bleed taps comprising a mid-compressor bleed tap axially between two of a plurality of variable vane assemblies of a compressor section of the gas turbine engine, at least one low stage bleed tap axially upstream from the mid-compressor bleed tap, and at least one high stage bleed tap axially downstream from the mid-compressor bleed tap;
  forming a mid-compressor bleed flow path from the mid-compressor bleed tap to an aircraft system through an external manifold in pneumatic communication with the mid-compressor bleed tap, wherein the external manifold is outside of a casing of the gas turbine engine, wherein the external manifold encases a unison ring and vane arm assembly of at least one of the plurality of variable vane assemblies proximate to the mid-compressor bleed tap, and an actuator of the at least one encased variable vane assembly is outside of the external manifold;
  configuring a valve system to select one of the engine bleed taps as a bleed air source for the aircraft system; and
  selectively opening and closing one or more valves of the valve system based on a bleed air demand to control delivery of the bleed air to the aircraft system.

17. The method as in claim 16, further comprising: controlling delivery of a portion of the bleed air to an anti-icing system of the aircraft.

18. The method as in claim 16, further comprising: establishing a buffering flow path in pneumatic communication between the external manifold and a bearing compartment of the gas turbine engine.

* * * * *